(12) United States Patent
Herrick

(10) Patent No.: US 8,770,596 B2
(45) Date of Patent: Jul. 8, 2014

(54) DEVICE FOR STEERING A TOBOGGAN

(76) Inventor: William C. Herrick, Elkins, NH (US)

( * ) Notice: Subject to any disclaimer, the term of this patent is extended or adjusted under 35 U.S.C. 154(b) by 397 days.

(21) Appl. No.: 13/385,151

(22) Filed: Feb. 6, 2012

(65) Prior Publication Data
US 2012/0205881 A1    Aug. 16, 2012

Related U.S. Application Data

(60) Provisional application No. 61/443,526, filed on Feb. 16, 2011.

(51) Int. Cl.
*B62B 17/00* (2006.01)

(52) U.S. Cl.
USPC ........................................... 280/18; 280/21.1

(58) Field of Classification Search
USPC .................................... 280/18, 21.1
See application file for complete search history.

(56) References Cited

U.S. PATENT DOCUMENTS

| | | | |
|---|---|---|---|
| 1,453,948 A | 5/1923 | Pottala | |
| 2,367,157 A | 1/1945 | Tufts | |
| 3,017,194 A * | 1/1962 | Anderson | 280/18 |
| 3,145,029 A | 8/1964 | Ollanketo | |
| 3,147,020 A | 9/1964 | Dahl | |
| 3,176,999 A * | 4/1965 | Atcherley, Jr. | 280/18 |
| 3,453,000 A * | 7/1969 | Asher | 280/18 |
| 3,684,306 A | 8/1972 | Rathmann | |
| 3,689,092 A | 9/1972 | Lake | |
| 3,705,730 A | 12/1972 | Berglsland | |
| 4,206,933 A * | 6/1980 | Koch | 280/18 |
| 4,243,238 A | 1/1981 | Johnson | |
| 4,262,919 A | 4/1981 | Krent | |
| 4,353,573 A | 10/1982 | Morgan | |
| D269,259 S | 6/1983 | Butler et al. | |
| 4,413,832 A | 11/1983 | Pendleton | |
| 4,878,980 A * | 11/1989 | Stedman | 156/299 |
| D331,206 S | 11/1992 | Nolan | |
| D374,846 S | 10/1996 | Dickhaut et al. | |
| 5,618,051 A | 4/1997 | Kobylenski et al. | |

(Continued)

FOREIGN PATENT DOCUMENTS

| | | | | |
|---|---|---|---|---|
| DE | 3503142 A1 * | 8/1985 | | B62B 15/00 |
| EP | 373502 A2 * | 6/1990 | | B62B 15/00 |

OTHER PUBLICATIONS

Fun-Care-Inc. Untermuli 3 6300 Zug Switzerland, Inflatable Airboard.

*Primary Examiner* — J. Allen Shriver, II
*Assistant Examiner* — Bridget Avery
(74) *Attorney, Agent, or Firm* — John J. Welch, Jr. Esq.

(57) ABSTRACT

The invention is made up of an intact interiorly hollow body portion unit having a flat posterior side, a flat topside and a flat, laterally curvaceous bottomside together with correspondingly curvaceous lateral sides extending from the locus of the posterior side and tapering to frontal edging. It has a pair of arched handle units affixed to the topside and three elongated runner units affixed to the bottomside thereof. There is an elongated strut glued to interior walling of the bottomside that runs from the posterior side to the frontal edging collinearly with the medially positioned one of the three runner units. The handle units are affixed to the flat topside via screws into centerholes within each one of each of two pairs of support stud units located interiorly within the body portion unit, and; the three runner units are adhesively affixed parallelwise to exterior walling of the flat bottomside.

18 Claims, 10 Drawing Sheets

(56) References Cited

U.S. PATENT DOCUMENTS

| | | | |
|---|---|---|---|
| 5,957,471 A * | 9/1999 | Weeks | ............................ 280/18 |
| D447,529 S | 9/2001 | Fireman et al. | |
| 6,349,950 B1 | 2/2002 | Levy et al. | |
| 6,834,867 B2 | 12/2004 | Smith | |
| 7,100,927 B2 | 9/2006 | Krent | |
| 7,837,232 B2 | 11/2010 | Richards | |
| 2005/0035564 A1 * | 2/2005 | Mehrmann | ..................... 280/18 |

* cited by examiner

DEVICE FOR STEERING A TOBOGGAN

PRIOR OR PARENT APPLICATIONS

The invention was the subject of a Provisional Patent Application with filing date of Feb. 16, 2011 and Application No. 61/443,526, which has however now been withdrawn and canceled by your Inventor, William C. Herrick.

FEDERALLY SPONSORED RESEARCH AND DEVELOPMENT

The invention is not the subject of any federally sponsored research and development.

BACKGROUND OF THE INVENTION

1. Field of the Invention

The invention relates to that coterie of devices utilized to slide over snow and/or ice during performance of cold weather sporting and recreational activities.

2. Related Art

The Information Disclosure Statement submitted herewith contains references in respect of art that somewhat resembles but does not anticipate the invention.

A SUMMARY OF THE INVENTION

1. A Brief Description of the Invention

The invention is a device meant to serve the purpose of steering a toboggan. The intact body portion unit of the invention is made of wood or fiberglass material. It could also be made of a hard, durable plastic based or metallic material as well. It is characterized by a flat, rectangularly shaped posterior side and a flat bilaterally curvaceous topside as well as a flat bilaterally curvaceous bottomside. Each lateral side of the body portion unit of the invention is likewise curvaceous such that the body portion unit of the invention tapers equivalently on each such side thereof as respects each such lateral side and as regards the respective lateral portions of the topside and bottomside thereof to vertically inclined frontal edging. The respective tapers of the lateral side portions of the body portion unit are equivalently but oppositely inclined as respects one another. The body portion unit of the invention is hollow interiorly. A pair of arched handle units are affixed to the topside of the body portion unit in parallelwise fashion near the posterior side thereof, with each handle unit being also located near respective ones of the lateral sides of the body portion unit of the invention. The handle units are typically made of wood but they could also be made of metal, fiberglass or hard plastic material as well. There are three (3) elongated runner units affixed parallel to one another within grooves forged within the bottomside of the body portion unit of the invention. The runner units are typically metallic, solid units that each taper to moderately blunt bottom edging. There is a middle runner unit extending from the posterior edging of the body portion to the frontal edge thereof. This runner unit is affixed in place just adjacent and below the locus of an elongated centrally positioned support strut unit affixed to the surface of the interior walling of the flat bottomside of the body portion unit, and the medial portion of the inner walling of the flat posterior side as well as to interior walling of the topside of the body portion unit, and; it runs forwardly to the junction of inner walling of the respective two lateral sides of the body portion unit just behind the frontal edging thereof. It runs collinearly with the middle runner unit. Parallelwise positioned respective pairs of support stud units are adhesively affixed with glue at flat topsides thereof to interior walling of the flat topside of the body portion unit and with glue at flat bottomsides thereof to interior walling of the flat bottomside of the body portion unit. The bottomsides of each pair of support stud units provide support for each lateral runner unit. A centerhole in each topside of each support stud unit receives a screw through holes in the anterior and posterior portions of each handle unit and holes in the flat topside of the body portion unit so as to thereby securely anchor the handle units to the flat topside of the body portion unit.

2. Objects of the Invention

It is virtually impossible to steer a conventional toboggan. This is notably so when someone is lying on his/her belly atop the toboggan. And, this is especially so when that persons is traversing curvaceous, hilly terrain downwardly on the toboggan at a relatively high rate of speed. The invention; held as it is, by a person lying on his/her belly atop a toboggan; in front of the toboggan with hands on the handle units of the invention and arms extended frontally outward enables such a person to easily steer the toboggan right to left or vice versa along a curved path while riding down a snowcapped and/or icy hill.

Utilization of the invention where one seeks to embark upon a toboggan ride renders that ride much more exciting and enjoyable than would be the case without such utilization. That such is the case is due to the fact that utilization of the invention while so riding a toboggan renders the ride eminently more controllable, thereby minimizing any propensity for one or more mishaps between the time of commencement and the time of termination of a curvaceous toboggan run over slippery, snowy, hilly terrain.

The invention carries with it a distinct advantage over, for example, toboggans that have built therein, facilities for any steering of the same. Such toboggans cannot reasonably and safely be steered around notably curved paths with the hands of persons lying on their bellys atop the toboggans. Such toboggans because of the amount of force needed in order to turn a steerable toboggan to the right or to the left, are meant, in reality, only to be operated by persons sitting atop them and steering with their feet and not their hands. Hence, such devices cannot readily be operated by persons lying thereupon as above and, as such, they accordingly cannot likewise be made the subjects of braking over curvaceous paths of travel when required for safety's sake, to wit, braking by such persons with the toe portions of boots on their feet being dragged on ground beyond the back portion of such toboggans upon any encountering of challenging downhill terrain or the presence of other persons in the vicinity of the speedily moving toboggans.

The invention moreover readily enables a user person to, with repeated use thereof, actually carve out with relative precision, an elongated, curved sliding pathway over snow and ice given its facility for enabling one to, so much more readily, safely and dependably steer a toboggan than would be case with resort to use of non-steerable toboggans or toboggans that have built therein steering components requiring, of necessity, steering only with such a user's feet.

A DESCRIPTION OF THE DRAWINGS

A DESCRIPTION OF THE PREFERRED EMBODIMENT

Figure 1:
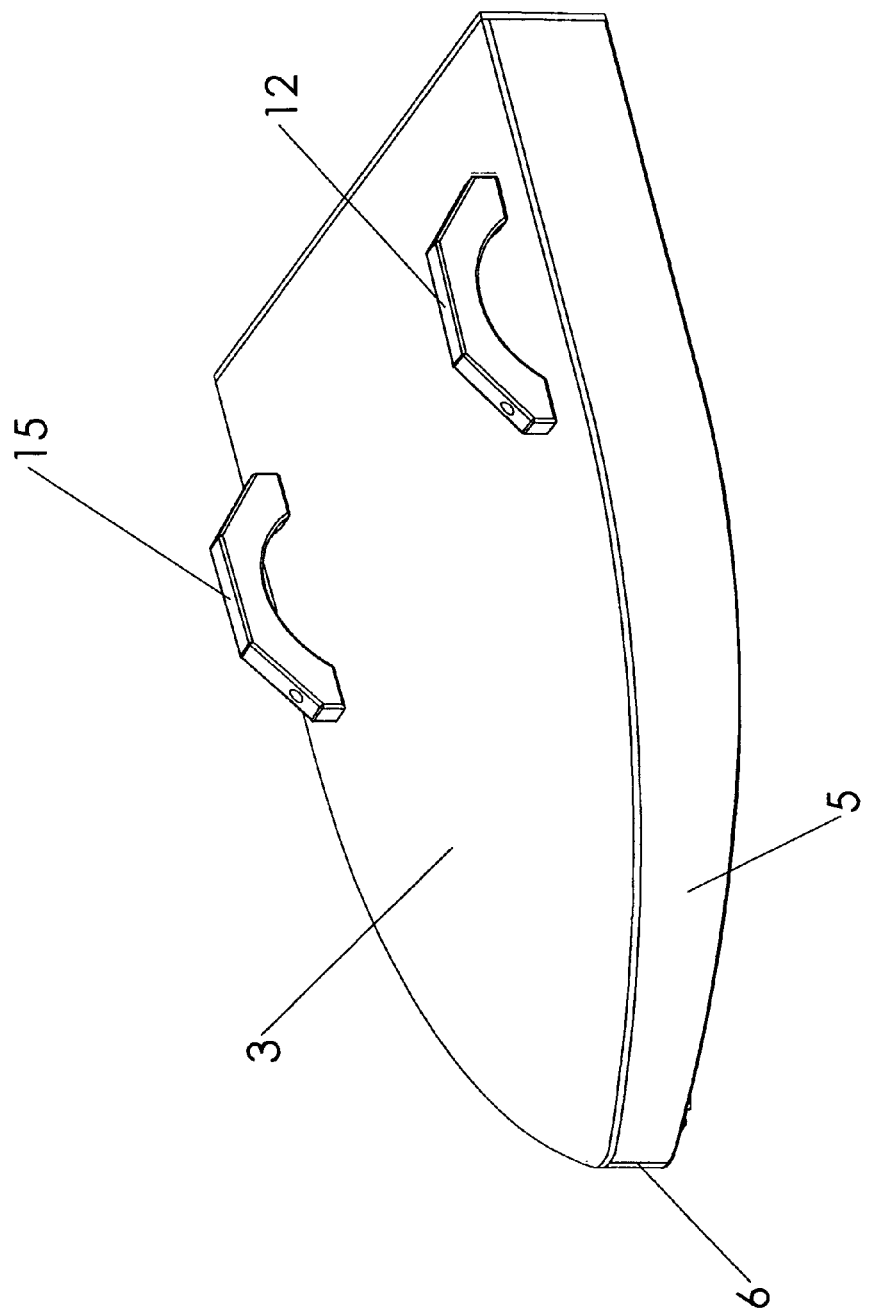
FIG. 1 is a first perspective view of the preferred embodiment of the invention.
Figure 2:
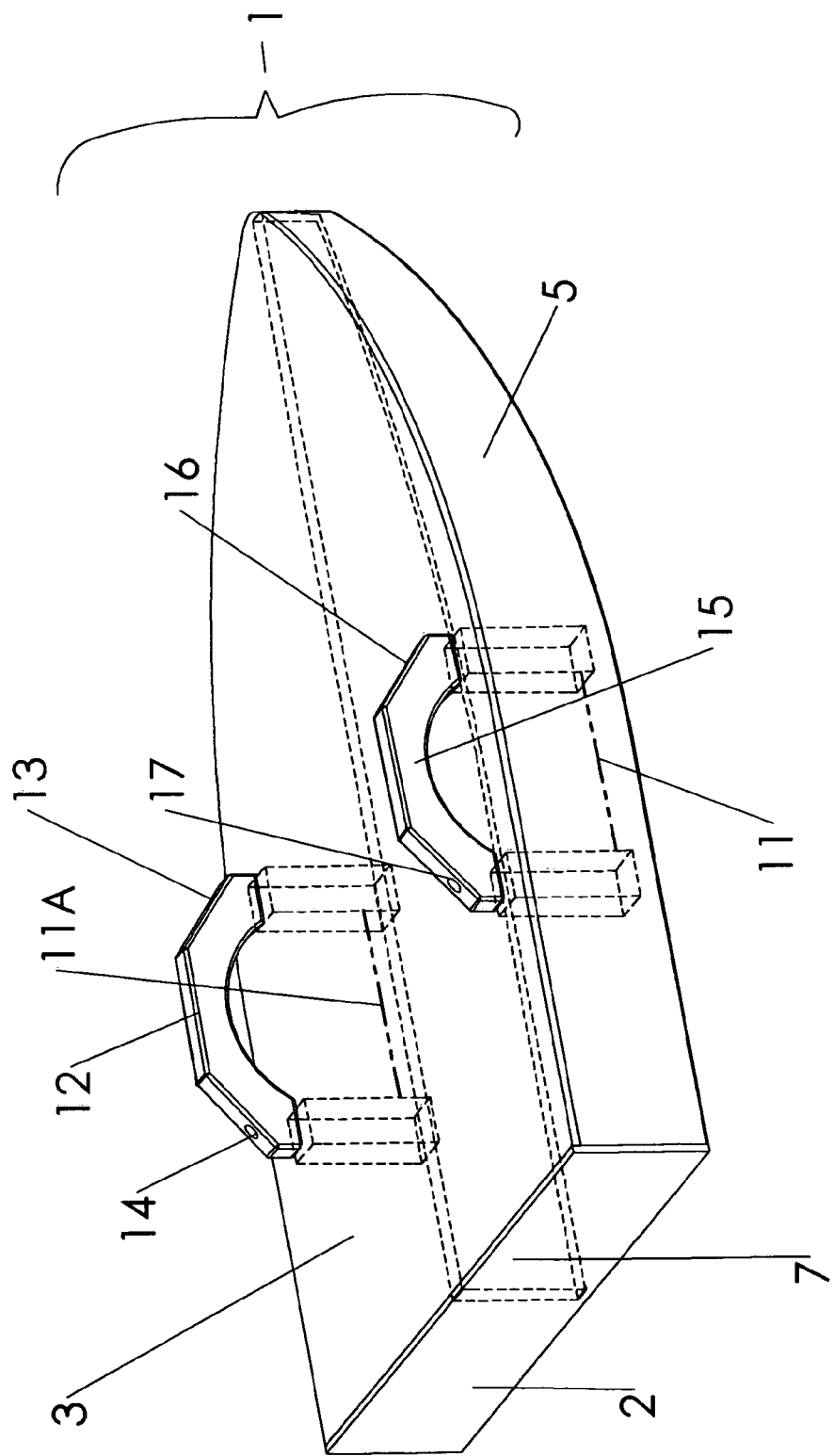
FIG. 2 is a second perspective view of the preferred embodiment of the invention.
Figure 3:
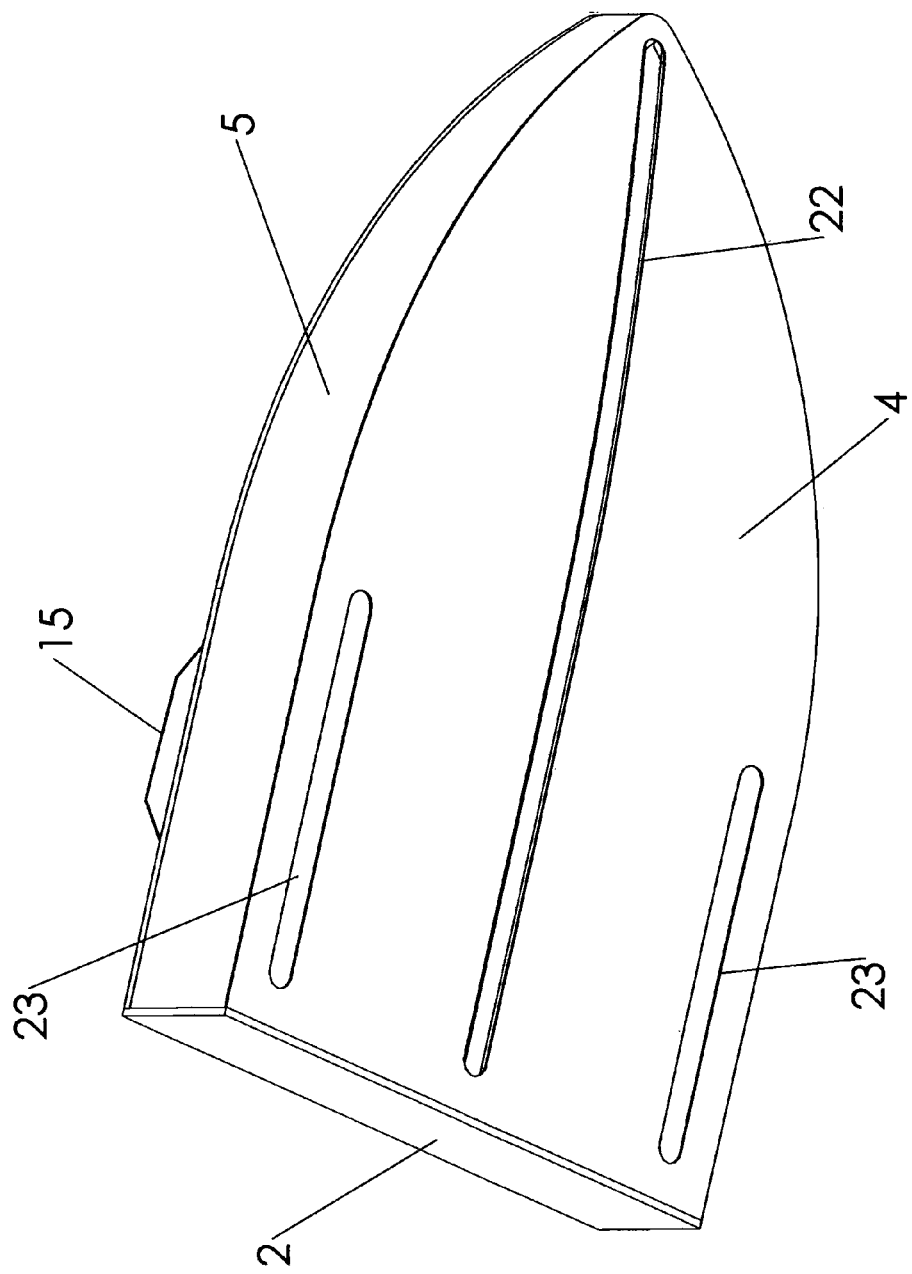
FIG. 3 is a first bottom plan view of the preferred embodiment of the invention without affixed runner units.
Figure 4:
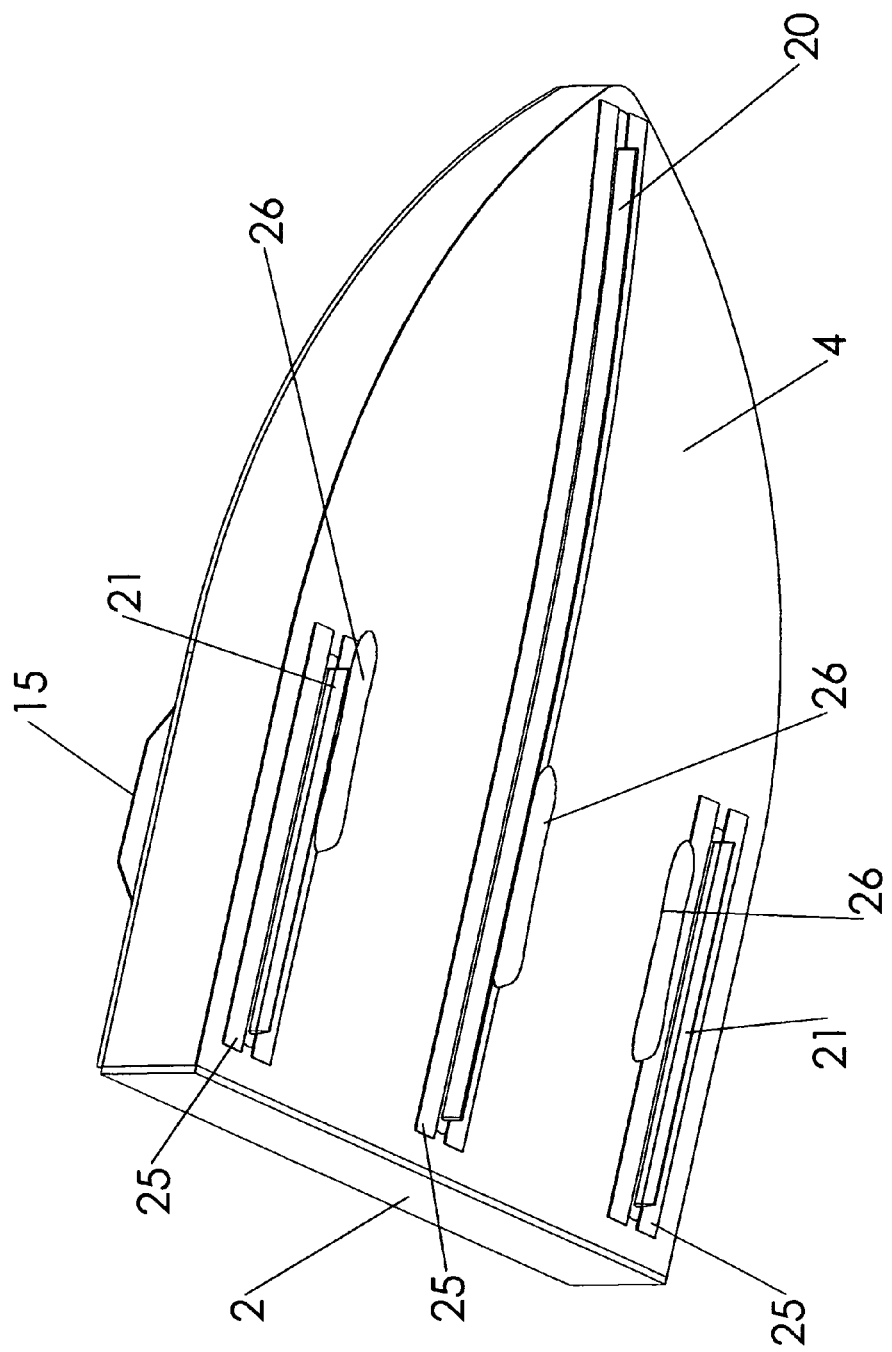
FIG. 4 is a bottom plan view of the preferred embodiment of the invention equipped with affixed runner units.
Figure 5:
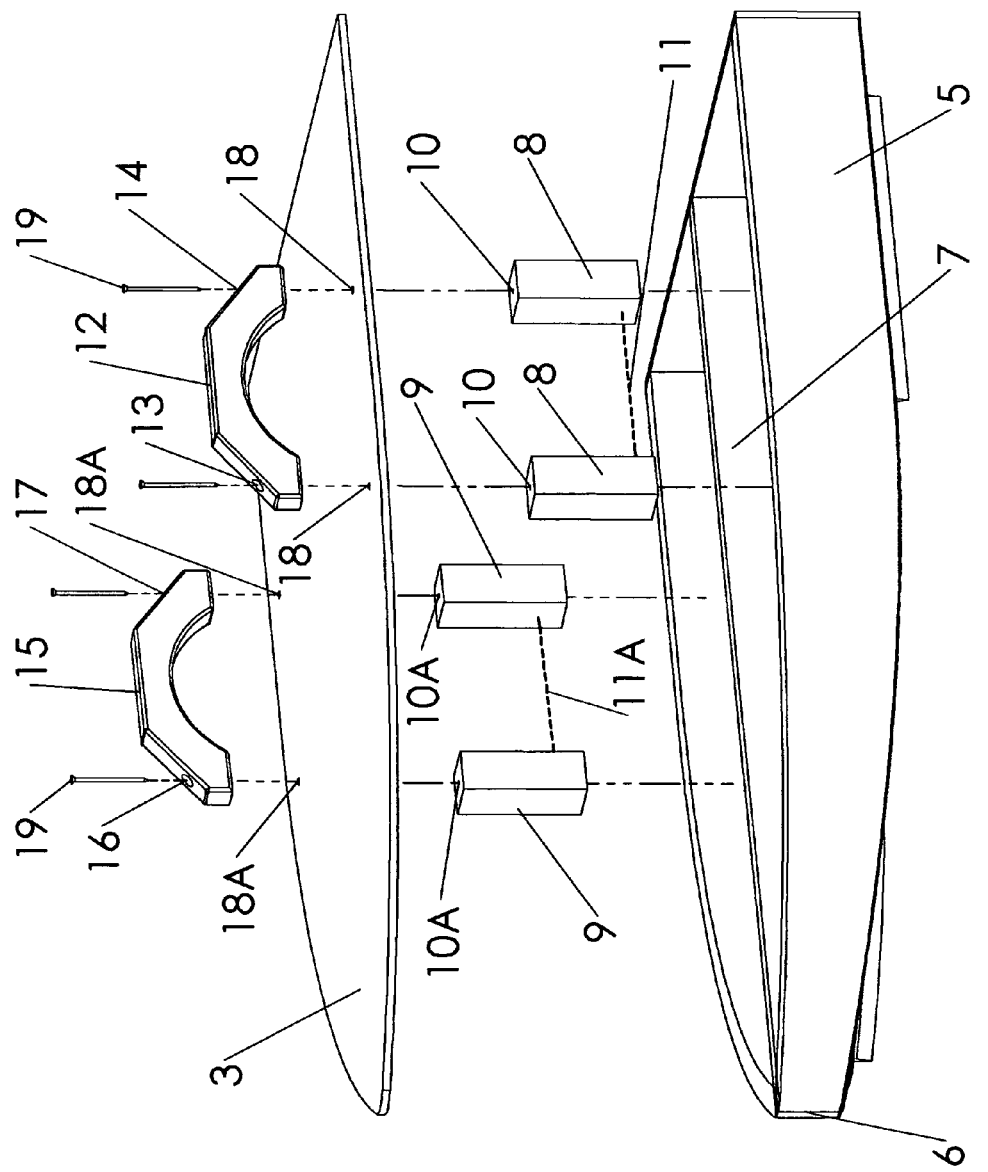
FIG. 5 is an exploded view of the preferred embodiment of the invention.
Figure 6:
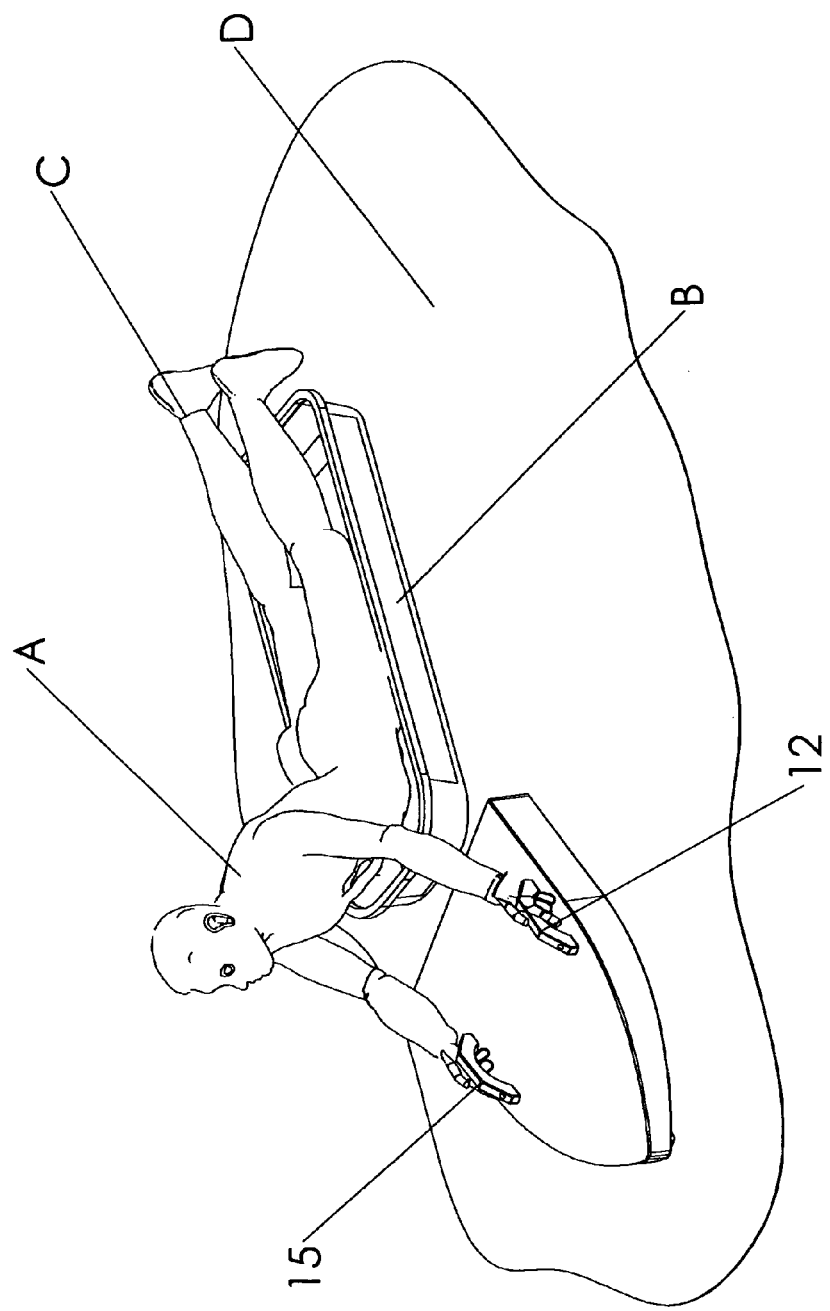
FIG. 6 shows a person utilizing the preferred embodiment of the invention to steer a toboggan down a hill around a curve.
Figure 7:
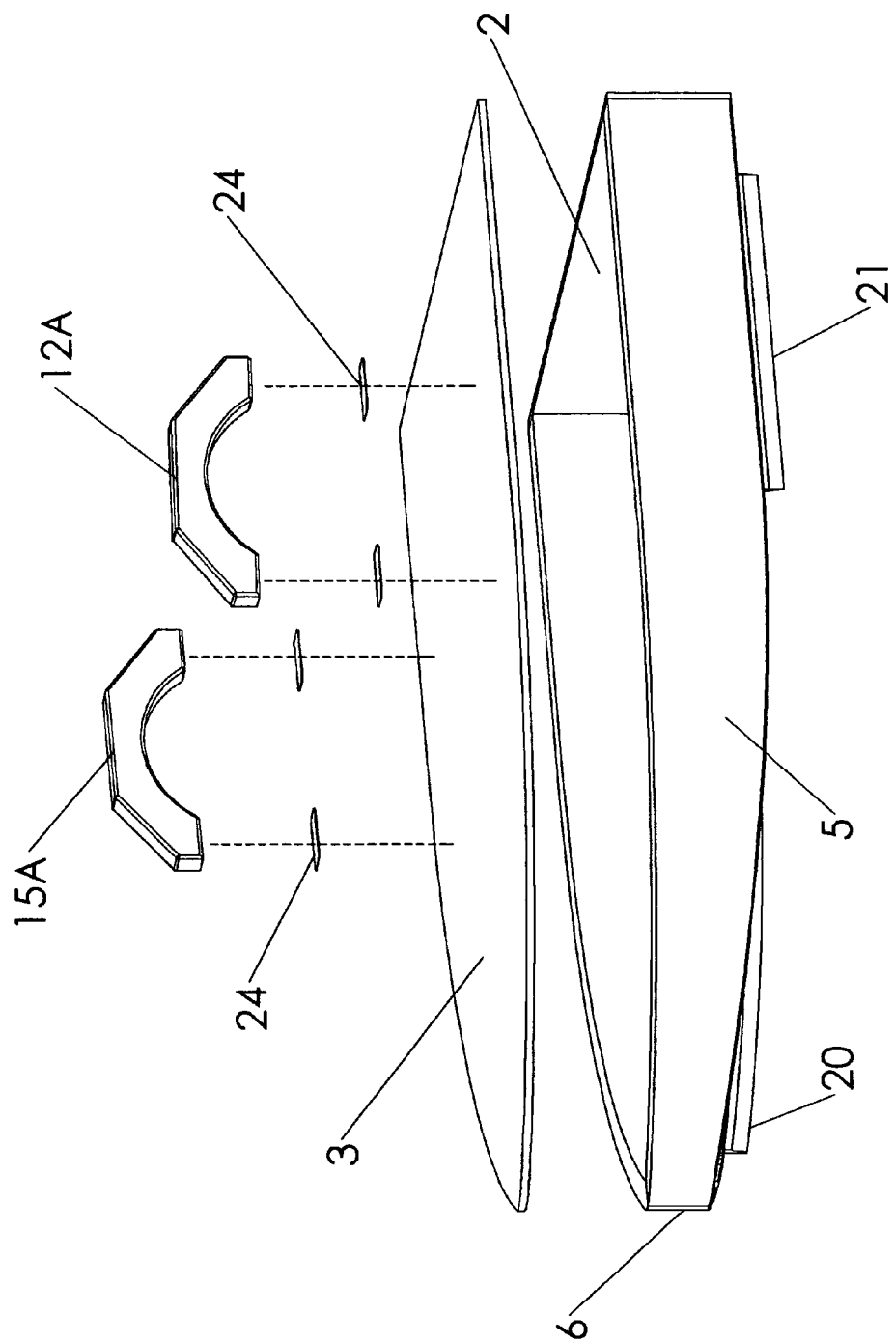
FIG. 7 is a first exploded view of a second embodiment of the invention.
Figure 8:
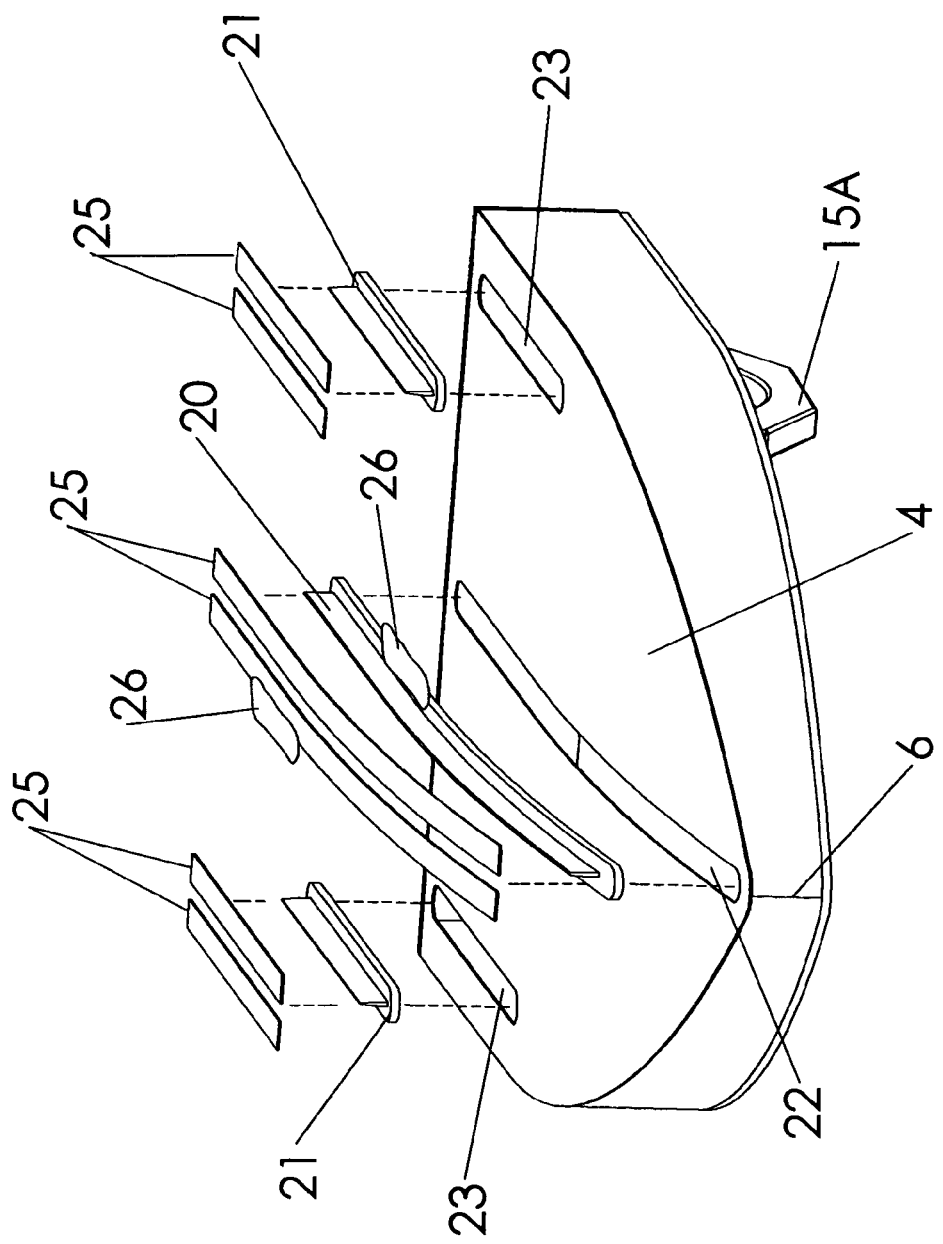
FIG. 8 is a perspective view with reference to the bottomside of the second embodiment
Figure 9:
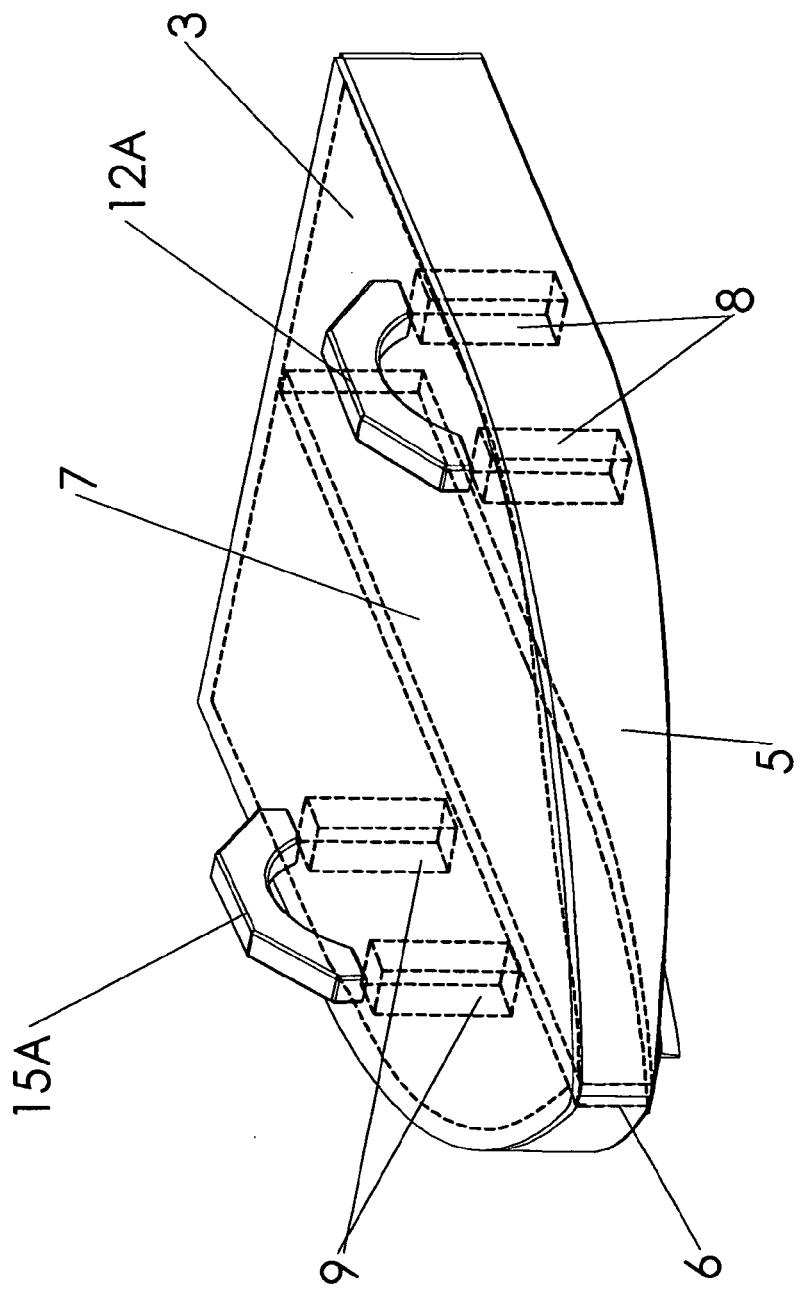
FIG. 9 is a perspective view of a third embodiment of the invention.
Figure 10:
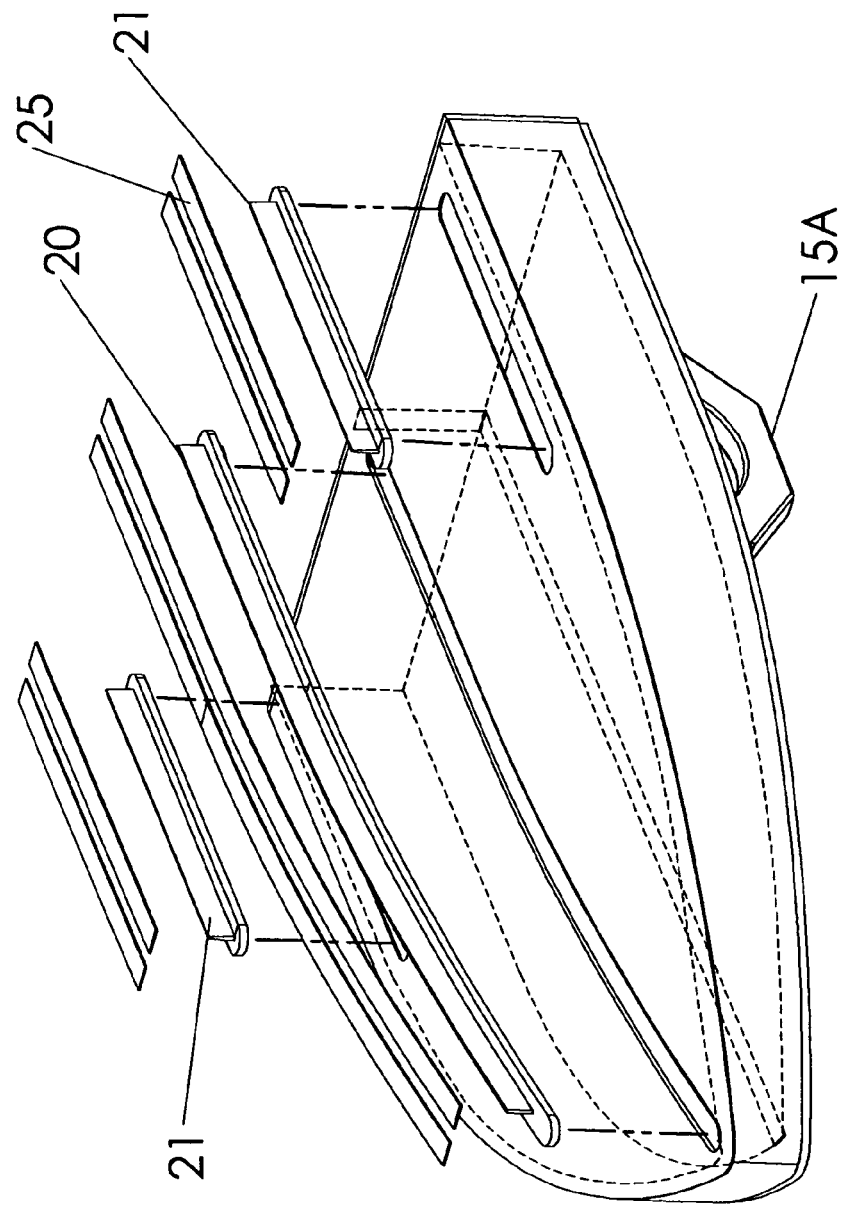
FIG. 10 is an exploded view with reference to the bottomside of the third embodiment.

As can be noted with reference to FIGS. 1 and 2, the invention for a preferred embodiment has an intact interiorly hollow body portion unit 1 characterized by the presence of a flat rectangularly shaped posterior side 2, a flat bilaterally curvaceous topside 3, a flat bilaterally curvaceous bottomside 4 and two curvaceous lateral sides 5 that, as respects each respective lateral side portion of unit 1, equivalently taper together with the respective lateral portions of topside 3 and bottomside 4 beginning at the locations of the edges of posterior side 2 with sides 3, 4 and 5 all ending, as respects such each respective lateral side portion of unit 1, at vertically inclined frontal edging 6 of unit 1. The respective tapers of the lateral side portions of unit 1 are equivalent but oppositely inclined as respects one another. FIG. 5 shows an elongated support strut 7 extending from the midline of interior walling of bottomside 4 to the location of frontal edging 6. Elongated wooden or hard, durable plastic support strut 7 as shown in FIG. 5 is affixed at a bottom edge thereof to the interior walling of bottomside 4, at back edging thereof to a medial portion of interior walling of posterior side 2, at superior edging thereof to interior walling of topside 3 and frontally at the junction of interior walling of each of lateral sides 5 directly behind frontal edging 6. All of such affixation is with glue material 24. A somewhat schematic depiction of glue material 24 is seen in FIG. 7. FIG. 5 also shows a first pair of support studs 8 and a second a second pair of support studs 9. Each of support studs 8 has a first pair centerhole 10 located in the topside of each. Each of support studs 9 has a second pair centerhole 10A located in a topside of each. Each of support studs 8 are adhesively affixed with glue material 24 a first stud distance 11 apart from one another at flat bottomsides of each to the interior walling of bottomside 4. Each of support studs 9 are adhesively affixed with glue material 24 a second stud distance 11A apart from one another at flat bottomsides of each to the interior walling of bottomside 4. Stud distances 11 and 11A are equal to one another and are depicted in FIG. 2. Support studs 8 and 9 are made of a wooden or hard, durable plastic material. The invention features a first arched handle unit 12 with an anterior vertically inclined through hole 13 and a posterior vertically inclined through hole 14. It also features a second arched handle unit 15 with an anterior vertically inclined through hole 16 and a posterior vertically inclined through hole 17. There is a pair of first arched handle unit holes 18 found in topside 3. There is a pair of second arched handle unit holes 18A also found in topside 3. Arched handle units 12 and 15 are wooden or made up of hard, durable plastic or they could also be metallic. Stud distance 11 serves to accommodate concentric alignment of centerholes 10 with holes 13, 14 and each of holes 18 for receipt of screws 19 for the purpose of anchoring first arched handle unit 12 to topside 3 as screws 19 are received one each ultimately into each of centerholes 10. Stud distance 11A serves to accommodate concentric alignment of centerholes 10A with holes 16, 17 and each of holes 18A for receipt of screws 19 for the purpose of anchoring second arched handle unit 15 to topside 3 as screws 19 are received one each ultimately into each of centerholes 10A. These features can be noted with reference to FIGS. 2 and 5. At this juncture, it should be noted that wooden or fiberglass or hard plastic variants of body portion unit 1 are assembled as follows: bottom edging of flat posterior side 2 is affixed with glue material 24 to the posteriormost portion of the interior walling of bottomside 4. The lateral portions of bottomside 4 respectively featuring tapers equivalent to the respective tapers of curvaceous lateral sides 5 are affixed together with sides 5 via glue material 24 applied at bottom edges of each of sides 5 and then applied to the lateralmost portions of the interior walling of bottomside 4. The posteriormost portion of each side 5 is also affixed with glue material 24 to each one of the lateral edges of posterior side 2. Support studs 8, 9 are affixed with glue material 24 to the interior walling of flat bottomside 4 as noted above as well as being similarly affixed also to interior walling of topside 3. Finally, interior walling of topside 3 with a taper at each lateral portion of side 3 being also equivalent to the taper of each side 5, and the taper of each lateral portion of bottomside 4, is affixed with glue material 24 applied to such topside 3 interior walling and to the uppermost edging of flat posterior side 2, the uppermost edging of each of lateral sides 5 and likewise to flat topsides of support studs 8 and 9. As respects metallic variants of body portion unit 1, affixation of flat posterior side 2 to bottomside 4, lateral sides 5, topside 3 and affixation of lateral sides 5 to topside 3 and bottomside 4 are accomplished in the manner specified above except by way of welding the sides 2, 4, 5 and 3 together rather than gluing them together. Typically metallic support studs 8 and 9 are affixed with glue material 24 to the interior walling of topside 3 and bottomside 4 as respects the positioning of such support studs 8 and 9 within metallic variants of body portion unit 1. Also, typically metallic elongated support struts 7 are affixed within metallic variants of body portion units 1 with glue material 24 in the manner specified above as respects such affixation in wooden, fiberglass or hard plastic variants of body portion unit. Elongated crevice shaped, metallic medial runner unit 20 is medially affixed to exterior walling of flat bottomside 4 within a medial groove 22 cut into such exterior walling of flat bottomside 4. Each of two elongated crevice shaped metallic lateral runner units 21 are similarly affixed to the exterior walling of flat bottomside 4 within lateral grooves 23 also cut into the exterior walling of bottomside 4. Grooves 22 and 23 are appreciated with reference to FIG. 3. Affixation of the runner units 20 and 21 into grooves 22 and 23 is accomplished by first covering the whole of each of the laterally extending topside edgings of runner units 20 and 21 positioned within grooves 22 and 23 with pieces of fiberglass matting material 25 as can be seen with reference to FIG. 4. Material 25 placed atop such laterally extending topside edgings of runner units 20 and 21 is then everywhere subjected to, along with all portions of the exterior walling of flat bottomside 4 in the near vicinity of matting material 25, an application of fiberglass resin adhesive substance 26 overlaying the whole of all of the pieces of material 25. Subsequent to such manner of affixation, substance 26, when dried and accordingly hardened over time, serves to durably and most dependably hold runner units 20 and 21 forever fast within grooves 22 and 23 to such exterior walling of flat bottomside 4. Each of runner units 20 and 21 then extends for equivalent distances forwardly along such exterior walling of bottomside 4, with runner units 21 also being equal in length to one another. Exemplary broken depictions of applied resin substance 26 are seen in FIG. 4. The lie of runner unit 20 so affixed to such exterior walling of flat bottomside 4 is collinear with the lie of elongated support strut 7 which is medially affixed as noted above to the interior walling of flat bottomside 4. The respective lies of lateral runner units 21 so affixed to such exterior walling of flat bottomside 4 are positioned such that each is interiorly supported by the flat bottomsides of first pair of support studs 8 and second pair of support studs 9 respectively. Runner units 20 and 21 affixed to the exterior walling of flat bottomside 4 as noted above within grooves 22 and 23 are so affixed as to be positioned in place parallel with one another. Runner units 20 and 21 being crevicely shaped could be sharply U-shaped or even nearly T-shaped as well as V-shaped along the wholes of their respective lengths. Support strut 7 and support studs 8 and 9 also positioned above grooves 23 serve to prevent any deformation of body portion unit 1 while the invention is in use by a person A lying atop a toboggan B while undertaking to steer toboggan B around a downhill curve C as shown in FIG. 6, with such a person A holding onto arched handle units 12 and 15 and putting pressure on body portion unit 1 and affixed runners 20 and 21 during the course of any such steering undertaking. A second embodiment of the invention, lacking a support strut 7 and lacking a first pair of support studs 8 and a second pair of support studs 9, features arched handle units 12A and 15A affixed with glue material 24 to exterior walling of topside 3 of body portion unit 1 thereof and runner units 20 and 21 are affixed in the manner as noted above with material 25 and substance 26 to exterior walling of bottomside 4 within parallelwise positioned grooves 22 and 23 cut into such exterior walling of flat bottomside 4 in the same manner as noted above. Arched handle units 12A and 15A lack any holes 13, 14 and 16, 17 respectively. Body portion unit 1 of the second embodiment as well as the third embodiment more fully described below also lacks any holes 18 and 18A. FIG. 7 is a first exploded view of this embodiment. FIG. 8 is a second exploded view with reference to bottomside 4 of this embodiment featuring runner units 20 and 21 in apposition to grooves 22 and 23 thereof. An exemplary depiction of a portion of resin substance 26 that is applied to the whole of all pieces of matting 25 is also seen in FIG. 8. A third embodiment of the invention shown in FIG. 9 features an interiorly hollow body portion unit 1 shaped as noted above but with an exteriorly positioned pair of arched handle units 12A and 15A and interiorly positioned pairs 8 and 9 of support studs and an interiorly positioned elongated support strut 7, all positioned relative to one another as noted above in respect of the description of the preferred embodiment but with all of such elements 1, 12A, 15A, 8, 9 and 7 being a molded composite whole entity to which runners 20 and 21 are affixed as noted above with respect to the description of the preferred and second embodiments either with fiberglass matting material 25 in combination with fiberglass resin adhesive substance 26 or instead simply only with glue material 24 within grooves 22 and 23 that are also molded into exterior walling of the flat bottomside 4 of the composite whole. FIG. 10 is an exploded view with reference to the bottomside 4 of this third embodiment featuring runner units 20 and 21 in apposition to grooves 22 and 23 thereof. The whole entity being the third embodiment is one amenable to being wholly composed of fiberglass material, or sturdy hard plastic material or even metallic material.

As was earlier mentioned, one cannot sit atop a conventional toboggan and steer it around curved pathways over downhill terrain while likewise hoping to dependably brake the toboggan whenever necessary. Such steering and braking when needed can only occur while a person A is lying atop a toboggan B so as to be able to dig the toe portions of his or her boots C into the ground D in any effort, to, when necessary, slow the moving toboggan B down. Hence, in order to dependably accomplish both tasks, when necessary, while operating a toboggan B; resort to utilization of the invention as shown in FIG. 6 would be required. When a person A is lying atop a moving toboggan B with his or her arms outstretched frontally and holding onto the arched handle units 12 and 15 thereof, a turning of the invention rightwardly or leftwardly will readily cause the toboggan B to then also turn either correspondingly rightwardly or leftwardly as the case may be. There are steerable toboggans in the art, but, because of the amount of force required to accomplish any such steering in respect of utilization of such devices, users must sit on these devices and steer with their feet. Such devices are very difficult if not impossible to steer with one's hands, especially if a user is a person such as one without a well-conditioned athlete's relatively enormous hand and arm strength.

In closing, in view of the fact that the invention allows for a toboggan user's ability to readily and enjoyably steer the moving toboggan around curves, regardless of inherent arm strength, while also being able to brake the toboggan when necessary in the interest of user safety as well as the safety of others nearby, the invention in such respects is, respectfully submitted, not only new and unique but it is unquestionably useful as well.

What is claimed is:

1. A device for steering a toboggan, comprising:
   a. An intact body portion unit;
   b. said body portion unit having a flat posterior side, a flat, bilaterally curvaceous topside, a flat, bilaterally curvaceous bottomside and each of two correspondingly curvaceous lateral sides;
   c. each lateral portion of said topside and each lateral portion of said bottomside and said each of two correspondingly curvaceous lateral sides extending from respective loci of opposite lateral edgings of said posterior side in equivalent but oppositely inclined tapers to vertically inclined frontal edging of said body portion unit;
   d. said body portion unit being interiorly hollow throughout;
   e. bottom edging of said flat posterior side being affixed with glue to a posteriormost portion of interior walling of said bottomside;
   f. said lateral sides being each affixed with glue at bottom edges thereof to lateralmost portions of said interior walling of said bottomside and to respective said lateral edgings of said posterior side;
   g. interior walling of said topside being affixed with glue to an uppermost edge of said flat posterior side and uppermost edges of said lateral sides;
   h. a first pair of solid support stud units with each one of said first pair of support stud units having a first pair centerhole in a flat topside of each of said first pair of solid support stud units;
   i. said each one of said first pair of support stud units being adhesively affixed with glue, a first stud distance apart at a flat stud bottomside of each to said interior walling of said flat bottomside of said body portion unit and being also adhesively affixed with glue at a flat stud topside of each to said interior walling of said flat topside of said body portion unit;

j. a second pair of solid support stud units with each one of said second pair of support stud units having a second pair centerhole in a flat topside of each said second pair of solid support stud units;

k. said each one of said second pair of support stud units being adhesively affixed with glue, a second stud distance apart at a flat stud bottomside of each to said interior walling of said flat bottomside of said body portion unit and being also adhesively affixed with glue at a flat stud topside of each to said interior walling of said flat topside of said body portion unit;

l. a first arched handle unit;

m. a second arched handle unit;

n. each of said first and second arched handle units having a vertically inclined through hole found in an anterior end portion of said each handle units and a duplicate vertically inclined through hole in a posterior end portion of said each handle units;

o. a pair of first arched handle unit holes in said topside;

p. a pair of second arched handle unit holes in said topside;

q. said first stud distance being equivalent in length to said second stud distance;

r. said first stud distance being such that each one of said first pair centerholes is concentric with one each of said vertically inclined through holes in said first arched handle unit and one each of said pair of first arched handle unit holes;

s. said second stud distance being such that each one of said second pair centerholes is concentric with one each of said vertically inclined through holes in said second arched handle unit and one each of said pair of second arched handle unit holes;

t. screws receivable, one each, by each one of said vertically inclined through holes in said first arched handle unit, each one of said pair of first arched handle unit holes and each one of said first pair centerholes in affixation of said first arched handle unit to said topside of said body portion unit;

u. screws receivable, one each, by each one of said vertically inclined through holes in said second arched handle unit, each one of said pair of second arched handle unit holes and each one of said second pair centerholes in affixation of said second arched handle unit to said topside of said body portion unit;

v. an elongated medially positioned support stmt affixed with glue at a bottom edge thereof to said interior walling of said flat bottomside and affixed with glue at superior edging thereof to said interior walling of said flat topside, and extending forwardly from where it is affixed at back edging thereof with glue to a medial portion of interior walling of said posterior side to where it is also affixed with glue to a junction of interior walling of each of said each lateral sides directly behind said frontal edging;

w. an elongated medially positioned crevice shaped, metallic medial runner unit being wholly covered about laterally extending topside edgings thereof with fiberglass matting material with all of said matting material and all adjacent portions of exterior walling of said bottomside being in turn wholly covered with a fiberglass resin adhesive substance for affixation of said medial runner unit to said exterior walling of said bottomside, and with said medial runner unit then extending so affixed forwardly along said exterior walling of said bottomside collinearly with and below said support strut;

x. each of two elongated laterally positioned crevice shaped, metallic lateral runner units equal in length being wholly covered about laterally extending topside edgings thereof with said fiberglass matting material with all of said matting material and all adjacent portions of said exterior walling of said bottomside being in turn wholly covered with said fiberglass resin adhesive substance for affixation of said two runner units to said exterior walling of said bottomside and with each of said each laterally positioned runner units extending so affixed for equivalent distances forwardly along said exterior walling of said bottomside, and;

y. said medial positioned runner unit and said lateral runner units being so adhesively affixed within a medial groove and lateral grooves respectively cut parallelwise into said exterior walling of said bottomside as to then be so affixed as to be parallel with one another.

2. The device for steering a toboggan of claim 1 whereby, said body portion unit, said solid support stud units, said support strut and said arched handle units are all made of wood.

3. The device for steering a toboggan of claim 1 whereby, said body portion unit, said solid support stud units, said support strut and said arched handle units are all made of hard, durable plastic material.

4. The device for steering a toboggan of claim 1 whereby, said body portion unit, said solid support stud units, said support strut and said arched handle units are all made of hard, durable fiberglass material.

5. The device for steering a toboggan of claim 4, whereby said solid support studs and said support strut are made of hard, durable plastic material and said arched handle units are metallic.

6. A device for steering a toboggan, comprising:

a. a wholly metallic body portion unit;

b. said body portion unit having a flat posterior side, a flat, bilaterally curvaceous topside, a flat, bilaterally curvaceous bottomside and each of two correspondingly curvaceous lateral sides;

c. each lateral portion of said topside and each lateral portion of said bottomside and said each of two correspondingly curvaceous lateral sides extending from respectively loci of opposite lateral edgings of said posterior side in equivalent but oppositely inclined tapers to vertically inclined frontal edging of said body portion unit;

d. said body portion unit being interiorly hollow throughout;

e. bottom edging of said flat posterior side being weldably affixed to a posteriormost portion of interior walling of said bottomside;

f. said lateral sides being each weldably affixed at bottom edges thereof to lateralmost portions of said interior walling of said bottomside and to respective said lateral edgings of said posterior side;

g. interior walling of said topside being weldably affixed to an uppermost edge of said flat posterior side and uppermost edges of said lateral sides;

h. a first pair of solid support stud units with each one of said first pair of support stud units having a first pair centerhole in a flat topside of each of said first pair of solid support stud units;

i. said each one of said first pair of support stud units being adhesively affixed with glue, a first stud distance apart at a flat stud bottomside of each to said interior walling of said flat bottomside of said body portion unit and being also adhesively affixed with glue at a flat stud topside of each to said interior walling of said flat topside of said body portion unit;

j. a second pair of solid support stud units with each one of said second pair of support stud units having a second pair centerhole in a flat topside of each said second pair of solid support stud units;

k. said each one of said second pair of support stud units being adhesively affixed with glue, a second stud distance apart at a flat stud bottomside of each to said interior walling of said flat bottomside of said body portion unit and being also adhesively affixed with glue at a flat stud topside of each to said interior walling of said flat topside of said body portion unit;

l. a first arched handle unit;

m. a second arched handle unit;

n. each of said first and second arched handle units having a vertically inclined through hole found in an anterior end portion of said each handle units, and a duplicate vertically inclined through hole in a posterior end portion of said each handle units;

o. a pair of first arched handle unit holes in said topside;

p. a pair of second arched handle unit holes in said topside;

q. said first stud distance being equivalent in length to said second stud distance;

r. said first stud distance being such that each one of said first pair centerholes is concentric with one each of said vertically inclined through holes in said first arched handle unit and one each of said pair of first arched handle unit holes;

s. said second stud distance being such that each one of said second pair centerholes is concentric with one each of said vertically inclined through holes in said second arched handle unit and one each of said pair of second arched handle unit holes;

t. screws receivable, one each, by each one of said vertically inclined through holes in said first arched handle unit, each one of said pair of first arched handle unit holes and each one of said first pair centerholes in affixation of said first arched handle unit to said topside of said body portion unit;

u. screws receivable, one each, by each one of said vertically inclined through holes in said second arched handle unit, each one of said pair of second arched handle unit holes and each one of said second pair centerholes in affixation of said second arched handle unit to said topside of said body portion unit;

v. an elongated medially positioned support strut affixed with glue at a bottom edge thereof to said interior walling of said flat bottomside and affixed with glue at superior edging thereof to said interior walling of said flat topside, and extending forwardly from where it is affixed at back edging thereof with glue to a medial portion of interior walling of said posterior side to where it is also affixed with glue to a junction of interior walling of each of said each lateral sides directly behind said frontal edging;

w. an elongated medially positioned crevice shaped, metallic medial runner unit being wholly covered about laterally extending topside edgings thereof with fiberglass matting material with all of said matting material and all adjacent portions of exterior walling of said bottom side in turn wholly covered with a fiberglass resin adhesive substance for affixation of said medial runner unit to exterior walling of said bottomside, and with said medial runner unit then extending so affixed forwardly along said exterior walling of said bottomside collinearly with and below said support strut;

x. each of two elongated laterally positioned crevice shaped, metallic lateral runner units equal in length being wholly covered about laterally extending topside edgings thereof with said fiberglass matting material with all of said matting material and all adjacent portions of said exterior walling of said bottomside being in turn wholly covered with said fiberglass resin adhesive substance for affixation of said two runner units to said exterior walling of said bottomside and with each of said each laterally positioned runner units extending so affixed for equivalent distances forwardly along said exterior walling of said bottomside, and;

y. said medial positioned runner unit and said lateral runner units being so adhesively affixed within a medial groove and lateral grooves respectively cut parallelwise into said exterior walling of said bottomside as to then be so affixed as to be parallel with one another.

7. The device for steering a toboggan of claim 6, whereby said solid support studs, said support strut and said arched handle units are all made of wood.

8. The device for steering a toboggan of claim 6, whereby said solid support studs, said support strut and said arched handle units are all made of hard, durable plastic material.

9. The device for steering a toboggan of claim 6, whereby said solid support studs, said support strut and said arched handle units are all made of hard, durable fiberglass plastic material.

10. The device for steering a toboggan of claim 6, whereby said solid support studs and said support strut are made of wood and said arched handle units are metallic.

11. A device for steering a toboggan, comprising;

a. a body portion unit being interiorly hollow throughout;

b. said body portion unit having a flat posterior side, a flat, bilaterally curvaceous topside, a flat, bilaterally curvaceous bottomside and each of two correspondingly curvaceous lateral sides;

c. each lateral portion of said topside and each lateral portion of said bottomside and said each of two correspondingly curvaceous lateral sides extending from respective loci of opposite lateral edgings of said posterior side in equivalent but oppositely inclined tapers to vertically inclined frontal edging of said body portion unit;

d. bottom edging of said flat posterior side being affixed with glue to a posteriormost portion of interior walling of said bottomside;

e. said lateral sides being each affixed with glue at bottom edges thereof to lateralmost portions of said interior walling of said bottomside and to respective said lateral edgings of said posterior side;

f. interior walling of said topside being affixed with glue to an uppermost edge of said flat posterior side and uppermost edges of said lateral sides;

g. a first arched handle unit;

h. a second arched handle unit;

i. said first arched handle unit and said second arched handle unit being parallelwise adhesively affixed with glue to exterior walling of said flat topside;

j. an elongated medially positioned crevice shaped, metallic medial runner unit being wholly covered about laterally extending topside edgings thereof with fiberglass matting material with all of said matting material and all adjacent portions of exterior walling of said bottomside being in turn wholly covered with a fiberglass resin adhesive substance for affixation of said medial runner unit to said exterior walling of said bottomside, and with said medial runner unit then extending so affixed forwardly along said exterior walling of said bottomside collinearly with and below said support strut;

k. each of two elongated laterally positioned crevice shaped, metallic lateral runner units equal in length being wholly covered about laterally extending topside edgings thereof with said fiberglass matting material with all of said matting material and all adjacent portions of said exterior walling of said bottomside being in turn wholly covered with said fiberglass resin adhesive substance for affixation of said two runner units to said exterior walling of said bottomside and with each of said each laterally positioned runner units extending so affixed for equivalent distances forwardly along said exterior walling of said bottomside, and;

l. said medial positioned runner unit and said lateral runner units being so adhesively affixed within a medial groove and lateral grooves respectively cut parallelwise into said exterior walling of said bottomside as to then be so affixed as to be parallel with one another.

12. The device for steering a toboggan of claim 11, whereby said body portion unit, said solid support stud units, said support strut and said arched handle units are all made of wood.

13. The device for steering a toboggan of claim 11, whereby said body portion unit, said solid support stud units, said support strut and said arched handle units are all made of hard, durable plastic material.

14. The device for steering a toboggan of claim 11, whereby said body portion unit, said solid support stud units, said support strut and said arched handle units are all made of hard, durable fiberglass material.

15. A device for steering a toboggan, comprising:
a. an interiorly hollow body portion unit;
b. said body portion unit having a flat posterior side, a flat, bilaterally curvaceous topside, a flat, bilaterally curvaceous bottomside and each of two correspondingly curvaceous lateral sides;
c. each lateral portion of said topside, and each lateral portion of said bottomside and said each of two correspondingly curvaceous lateral sides extending from respective end portions of said posterior side in equivalent but oppositely inclined tapers to vertically inclined frontal edging of said body portion unit;
d. said body portion unit also featuring a pair of parallelwise positioned arched handle units extending upwardly from said topside thereof;
e. said body portion unit moreover featuring an elongated, solidified, medially positioned, heightened strut unit portion extending along and conjoined with interior walling of said bottomside and conjoined with interior walling of said topside and extending forwardly from a locus of conjunction of said strut unit portion with interior walling of said posterior side to a locus of conjunction of said strut unit portion with interior walling of said each of two lateral sides directly behind said frontal edging;
f. each of a said first pair of solid support stud units extending from conjunction with said interior walling of said topside to conjunction with said interior walling of said bottomside;
g. each of a second pair of solid support stud units extending from conjunction with said interior walling of said topside to conjunction with said interior walling of said bottomside;
h. a first stud distance separating each of said first pair of solid support stud units;
i. a second stud distance separating each of said second pair of solid support stud units;
j. said first stud distance being equivalent to said second stud distance;
k. an elongated medially positioned crevice shaped, metallic medial runner unit being wholly covered about laterally extending topside edgings thereof with fiberglass matting material with all of said matting material and all adjacent portions of exterior walling of said bottomside being in turn wholly covered with a fiberglass resin adhesive substance for affixation of said medial runner unit to said exterior walling of said bottomside, and with said medial runner unit then extending so affixed forwardly along said exterior walling of said bottomside collinearly with and below said support strut;
l. each of two elongated laterally positioned crevice shaped, metallic lateral runner units equal in length being wholly covered about laterally extending topside edgings thereof with said fiberglass matting material with all of said matting material and all adjacent portions of said exterior walling of said bottomside being in turn wholly covered with said fiberglass resin adhesive substance for affixation of said two runner units to said exterior walling of said bottomside and with each of said each laterally positioned runner units extending so affixed for equivalent distances forwardly along said exterior walling of said bottomside, and;
m. said medial positioned runner unit and said lateral runner units being so adhesively affixed within a medial groove and lateral grooves respectively cut parallelwise into said exterior walling of said bottomside as to then be so affixed as to be parallel with one another.

16. The device for steering a toboggan of claim 15, whereby, said body portion unit, said arched handle units and said solid support studs are together one composite whole made of fiberglass material.

17. The device for steering a toboggan of claim 15, whereby, said body portion unit, said arched handle units and said solid support studs are together one composite whole made of hard plastic material.

18. The device for steering a toboggan of claim 15, whereby, said body portion unit, said arched handle units and said solid support studs are together one composite whole made of metallic material.

* * * * *